(12) United States Patent
Wagner et al.

(10) Patent No.: US 7,094,834 B2
(45) Date of Patent: Aug. 22, 2006

(54) SHINY, IMPACT-RESISTANT POLYSTYROL WHICH IS RESISTANT TO TENSION CRACKS

(75) Inventors: Daniel Wagner, Bad Dürkheim (DE); Peter Weinkötz, Mannheim (DE); Herbert Morgenstern, Ellerstadt (DE); Hans-Jürgen Renner, Neuhofen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/484,150

(22) PCT Filed: Jul. 16, 2002

(86) PCT No.: PCT/EP02/07886

§ 371 (c)(1),
(2), (4) Date: Jan. 20, 2004

(87) PCT Pub. No.: WO03/011964

PCT Pub. Date: Feb. 13, 2003

(65) Prior Publication Data

US 2004/0167279 A1 Aug. 26, 2004

(30) Foreign Application Priority Data

Jul. 27, 2001 (DE) ................ 101 36 133

(51) Int. Cl.
*C08L 53/00* (2006.01)
*B32B 27/14* (2006.01)

(52) U.S. Cl. .............. 525/89; 525/98; 525/316; 428/34.6; 428/43; 428/332; 428/517; 428/594

(58) Field of Classification Search .......... 525/89, 525/98, 316, 326; 428/332, 43, 517, 34.6, 428/594
See application file for complete search history.

(56) References Cited

U.S. PATENT DOCUMENTS

| 4,371,663 A | 2/1983 | Russell |
| 5,972,519 A | 10/1999 | Niessner et al. |
| 6,011,117 A * | 1/2000 | Perkins et al. ............ 525/99 |
| 6,369,160 B1 | 4/2002 | Knoll et al. |
| 6,589,646 B1 * | 7/2003 | Morgenstern .......... 428/318.6 |

FOREIGN PATENT DOCUMENTS

| WO | 96/20248 | 7/1996 |
| WO | 96/23823 | 8/1996 |
| WO | 00/24578 | 5/2000 |

* cited by examiner

*Primary Examiner*—James J. Seidleck
*Assistant Examiner*—Olga Asinovsky
(74) *Attorney, Agent, or Firm*—Novak, Druce, DeLuca & Quigg, LLP

(57) ABSTRACT

A process for increasing the stress-cracking resistance of polystyrene molding compositions, stress-cracking-resistant, glossy polystyrene molding compositions, composite layered sheets or composite layered films with an outer layer of this type, and also processes for producing moldings for refrigeration equipment.

12 Claims, No Drawings

SHINY, IMPACT-RESISTANT POLYSTYROL WHICH IS RESISTANT TO TENSION CRACKS

The invention relates to a process for increasing the stress-cracking resistance of polystyrene molding compositions, to stress-cracking-resistant, glossy polystyrene molding compositions, to composite layered sheets or composite layered films with an outer layer of this type, and also to processes for producing moldings for refrigeration equipment.

Nowadays, internal containers and inner door panels in refrigerators and freezers are mainly produced by thermoforming extruded semifinished sheeting (sheets or films) made from specific impact-resistant polystyrenes (ESCR-HIPS) which are stress-cracking-resistant with respect to polyurethane blowing agents, such as cyclopentane. Stress-cracking-resistant impact-resistant polystyrenes generally have a very matt surface. This disadvantage can be overcome by coextruding a gloss layer or by film-lamination.

Nowadays, gloss-layered coextrusion onto ESCR-HIPS mainly uses impact-resistant polystyrenes with high surface gloss, also often blended with free-flowing standard polystyrenes (GPPS). A disadvantage here is the marked impairment of stress-cracking resistance with respect to oils, fats, and cleaning compositions. This increases susceptibility to damage by stress cracking, in particular in the case of internal containers for refrigerators or freezers.

Polystyrene molding compositions made from polystyrene and from a thermoplastically styrene-based elastomer (STPE) are known, and examples of descriptions of these are found in WO 96/20248 and WO 99/46330, where the STPE is mainly used to increase toughness or adjust mechanical properties. OZ WO 00/24578 describes incorporation of lubricant in the form of a masterbatch comprising styrene-butadiene block copolymer into composite sheets with polystyrene outer layers. The elastomeric properties and the transparency required mean that a STPE is present as main component in the films described in WO 96/23823 and WO 97/46608.

It is an object of the present invention, therefore, to overcome the abovementioned disadvantages and to provide a process for increasing the stress-cracking resistance of polystyrene molding compositions, and also to provide polystyrene molding compositions which are both stress-cracking-resistant and glossy.

We have found that this object is achieved by means of a process for increasing the stress-cracking resistance of polystyrene molding compositions, where a styrene-based thermoplastic elastomer (STPE) is admixed with the polystyrene molding compositions.

The STPE preferably has a tensile strain at break of more than 300%, particularly preferably more than 500%, in particular more than 600%, measured to ISO 527, and the amount admixed is in the range from 1 to 40% by weight, preferably from 5 to 30% by weight, based on the polystyrene molding composition. The STPE particularly preferably admixed is a linear or star-type styrene-butadiene block copolymer with external polystyrene blocks S and, between these, styrene-butadiene copolymer blocks with random styrene/butadiene distribution $(S/B)_{random}$, or with a styrene gradient $(S/B)_{taper}$.

The total butadiene content is preferably in the range from 15 to 50% by weight, particularly preferably in the range from 25 to 40% by weight, and the total styrene content is therefore preferably in the range from 50 to 85% by weight, particularly preferably in the range from 60 to 75% by weight.

The styrene-butadiene block (S/B) is preferably composed of from 30 to 75% by weight of styrene and from 25 to 70% by weight of butadiene. The block (S/B) particularly preferably has a butadiene content of from 35 to 70% by weight and a styrene content of from 30 to 65% by weight.

The proportion of the polystyrene blocks S is preferably in the range from 5 to 40% by weight, in particular in the range from 25 to 35% by weight, based on the entire block copolymer. The proportion of the copolymer blocks S/B is preferably in the range from 60 to 95% by weight, in particular in the range from 65 to 75% by weight.

Particular preference is given to linear styrene-butadiene block copolymers of the general structure S-(S/B)-S having one or more, situated between the two S blocks, blocks $(S/B)_{random}$ having a random styrene/butadiene distribution. Block copolymers of this type are obtainable by anionic polymerization in a non-polar solvent with addition of a polar cosolvent or of a potassium salt, for example as described in WO 95/35335 or WO 97/40079.

Suitable polystyrene molding compositions are standard polystyrene (GPPS), impact-modified polystyrene (HIPS), and polymer mixtures which comprise these polystyrenes, in particular glossy, impact-modified polystyrenes (HIPS) with a surface gloss of at least 40%, preferably at least 70%, in particular at least 80%, measured at an angle of 60° to DIN 67530, or a mixture of these with standard polystyrene (GPPS).

Depending on the nature of the STPE admixed, even small amounts can increase the stress-cracking resistance of the polystyrene molding composition. Preferred polystyrene molding compositions comprise A) from 70 to 95% by weight, preferably 75 to 85% by weight, of a glossy impact-modified polystyrene (HIPS) with a surface gloss of more than 40%, preferably more than 70%, and particularly preferably more than 80%, measured at an angle of 60° to DIN 67530, or a mixture thereof with standard polystyrene (GPPS), and B) from 5 to 30% by weight, preferably from 15 to 25% by weight, of a styrene-based thermoplastic elastomer (STPE).

The abovementioned styrene-butadiene block copolymers are suitable as STPE.

The polystyrene molding compositions of the invention may moreover comprise the usual auxiliaries and additives, such as lubricants, antiblocking agents, release agents, stabilizers, antistats, flame retardants, colorants, etc.

In another embodiment of the invention, the stress-cracking-resistant, glossy polystyrene molding compositions may be used as outer gloss layer in composite sheets or composite films. Preferred composite layered sheets or composite layered films comprise a substrate layer made from an amorphous styrene polymer, such as standard polystyrene (GPPS) or impact-modified polystyrene (HIPS), and comprise an outer layer made from the stress-cracking-resistant and glossy polystyrene molding composition described above.

The substrate layer preferably comprises a stress-cracking-resistant, impact-modified polystyrene, for example where the composite layered sheet is intended for producing moldings for refrigeration equipment.

The substrate layer is particularly preferably composed of from 20 to 100% by weight of impact-resistant polystyrene (HIPS) and from 0 to 80% by weight of standard polystyrene. It is advantageous to use impact-resistant polystyrenes with increased stress-cracking resistance, these being known as ESCR-HIPS. These generally have a gel content of at least 30% and an average particle size of the disperse rubber phase, determined by light scattering, of at least 5 µm.

The outer layer generally has a thickness of from 1 to 10%, preferably from 2 to 5%, based on the total thickness of the composite layered sheet or composite layered film. The total thickness depends on the application, and may generally be from 0.1 to 10 mm, preferably from 0.5 to 5 mm.

The outer layer preferably comprises from 0.1 to 5% by weight, based on the polystyrene molding composition, of a lubricant, such as stearates.

The increased stress-cracking resistance of the polystyrene molding compositions of the invention, and also of the composite layered sheets or composite layered films in which these are present as outer layer, together with their high surface gloss, make them suitable for producing moldings for refrigeration equipment.

EXAMPLES

Example PS 1

A styrene-butadiene block copolymer (STPE) as in WO 95/35335 (Styroflex® 6105) and a free-flowing impact-modified polystyrene (BASF polystyrene 454 C), each in the form of pellets, were mixed in a Rhönrad mixer and then injection molded to give tensile test specimens to ISO 3167.

Example PS 2

Example 1 was repeated, except that the impact-modified polystyrene used was (BASF polystyrene 473 D).

Stress-cracking resistance (ESCR) was assessed using the tensile strain at break, determined by a method based on the "flex-strip method" described in ISO 4599. To this end, the injection-molded tensile test specimens were clamped over flex templates with a radius of 170 mm and exposed for 10 and, respectively, 50 minutes to a cyclopentane atmosphere (CP) in an autoclave at a pressure of 300 mbar, and then tensile-tested to ISO 527. Tensile test specimens with no exposure to solvent (air) were tested as a reference.

The makeup of the specimens and results from Examples 1 and 2 are given in Table 1.

TABLE 1

Stress-cracking resistance of injection-molded specimens as a function of cyclopentane exposure time, measured in terms of tensile strain at break [%]

| Example | STPE [% by weight] | 0 min | 10 min | 50 min |
|---|---|---|---|---|
| PS 1 | 0 | 28 | 12 | 27 |
| PS 1 | 5 | 36 | 35 | 45 |
| PS 1 | 10 | 47 | 39 | 59 |
| PS 1 | 15 | 63 | 74 | 63 |
| PS 1 | 20 | 74 | 87 | 85 |
| PS 2 | 0 | 41 | 20 | 27 |
| PS 2 | 5 | 44 | 34 | 50 |
| PS 2 | 10 | 39 | 40 | 57 |
| PS 2 | 15 | 48 | 55 | 85 |
| PS 2 | 20 | 71 | 105 | 116 |

Composite layered sheets with gloss outer layer:

Examples E1 to E7 and Comparative Experiments C1 and C2

Composite layered sheets with a substrate layer (A) of thickness 2.9 mm and an outer layer (B) of thickness 0.1 mm, and the makeup listed in Table 2 were produced by coextrusion.

Products for Substrate Layer A:

(A 1): Impact-resistant polystyrene with a melt volume rate MVR 200/5 of 3.4, a tensile modulus of elasticity of 1600 MPa, and a yield strain of 21 MPa (polystyrene 2710 from BASF AG).

(A 2): Impact-resistant polystyrene with a melt volume rate MVR 200/5 of 6.5, a tensile modulus of elasticity of 1400 MPa, and a yield strain of 17 MPa (polystyrene 2712 from BASF AG).

(A 3): Mixture made from an impact-resistant polystyrene with a melt volume rate MVR 200/5 of 4, a tensile modulus of elasticity of 1800 MPa, and a yield strain of 24 MPa (polystyrene 486 M from BASF AG) and a standard polystyrene with a melt volume rate MVR 200/5 of 3, a tensile modulus of elasticity of 3300 MPa and a Vicat B temperature of 101° C. (polystyrene 158 K from BASF AG); blending ratio 80:20.

Products for Outer Layer:

High-gloss impact-modified polystyrene with a melt volume rate MVR 200/5 of 4, a tensile-modulus of elasticity of 1900 MPa, and a yield strain of 32 MPa (polystyrene 585 K, BASF)

High-gloss impact-modified polystyrene (polystyrene 555 G, BASF)

Free-flowing standard polystyrene with a melt volume rate MVR 200/5 of 10, a tensile modulus of elasticity of 3300 MPa, and a yield strain of 46 MPa (polystyrene 143 E, BASF)

Styrene-butadiene block copolymer as in WO 95/35335 (Styroflex® BX 6105, BASF) with a tensile strain at break to DIN 53455 of more than 650% (STPE).

TABLE 2

Makeup of layers of composite sheets:

| Experiment | (A) | Makeup of outer layer (B); (Data are proportions by weight) |
|---|---|---|
| C 1 | A 1 | PS 585 K |
| C 2 | A 1 | PS 585 K:143 E (2:1) |
| E 1 | A 2 | PS 585 K:Styroflex BX 6105 (97:3) |
| E 2 | A 1 | PS 585 K:Styroflex BX 6105 (95:5) |
| E 3 | A 1 | PS 585 K:Styroflex BX 6105 (90:10) |
| E 5 | A 2 | PS 585 K:Styroflex BX 6105 (80:20) |
| E 5 | A 3 | PS 585 K:Styroflex BX 6105 (60:40) |
| E 6 | A 1 | PS 555 G:PS 143 E:Styroflex BX 6105 (50:30:20) |
| E 7 | A 1 | PS 585 K:PS 143 E:Styroflex BX 6105 (50:35:15) |

Examples E1 to E4, E6, and E7, and comparative experiments C1 and C2 have very high surface gloss of from 85 to 95% for the outer layer, measured at an angle of 60° (DIN 67530). Surface gloss for example E5 was 75%.

Stress-cracking resistance (ESCR) was assessed using the tensile strain at break, determined by a method based on the "flex-strip method" described in ISO 4599. To this end, tensile test specimens were produced from the composite panels, longitudinally and perpendicularly to the direction of extrusion, and were clamped over flex templates with radius of r1=1000 mm and r2=500 mm. A mixture made from olive oil/oleic acid (1:1) was used to coat the resultant gloss layer upper sides under tensile stress. After aging for 24 h, the test specimens were subjected to the ISO 527 tensile test. Clamped tensile test specimens with no exposure to solvent (air) were tested as a reference (indicated as 0 specimen below).

The results from the stress-cracking studies show that conventional outer layers as in comparative experiments C1 and C2 are highly susceptible to stress cracking with respect to the test medium of olive oil/oleic acid (OO/OA). Most of the specimens break within the contact time of 24 hours. Examples E1 to E7 show that the tensile strains at break rise markedly as STPE content increases, the outer layers being substantially more stress-cracking resistant.

At 40% Styroflex modification (Example E5) very high stress-cracking resistance (ESCR) is obtained. However, the gloss and scratch resistance (Table 4) of the outer layer do not achieve the level obtained with smaller amounts of Styroflex modification.

Results of Scratch Resistance Studies:

The gloss layer sides were tested using a scratch tester and 3 types of scratch: F=0.7 N/1.4 N/2.6 N (diamond tip angle =120°, radius=0.2 mm)

TABLE 4 scratch resistance and scratch depth [μm]

| Scratch depth (μm) at: composite layered sheet: | F = 0.7 N | F = 1.4 N | F = 2.6 N |
|---|---|---|---|
| C1 | 1.0 | 4.9 | 12 |
| C2 | 0.9 | 4.8 | 9 |
| E1 | 1.2 | 5 | 8 |
| E2 | 1.3 | 5.2 | 7 |
| E3 | 1.2 | 5.3 | 7.5 |
| E4 | 1.6 | 6.1 | 12 |
| E5 | 3.8 | 10 | 22 |
| E6 | 1.1 | 5.8 | 11 |
| E7 | 1.0 | 4.1 | 9.7 |

TABLE 2

Results from stress cracking tests:

| | Flexing radius [mm] | C1 | C2 | E1 | E2 | E3 | E4 | E5 | E6 | E7 |
|---|---|---|---|---|---|---|---|---|---|---|
| TB l/0 specimen | 1000 | 35 | 28 | 34 | 36 | 39 | 48 | 56 | 36 | 34 |
| TB t/0 specimen | 1000 | 32 | 26 | 30 | 32 | 36 | 45 | 48 | 32 | 30 |
| TB l/24 hrs OO/OA | 1000 | 4 | 3 | 5 | 12 | 23 | 35 | 45 | 28 | 26 |
| TB t/24 hrs OO/OA | 1000 | br. | br. | br. | 4 | 18 | 27 | 42 | 18 | 20 |
| TB l/24 hrs OO/OA | 500 | 2 | br. | 3 | 8 | 21 | 28 | 43 | 25 | 20 |
| TB t/24 hrs OO/OA | 500 | br. | br. | br. | 2 | 14 | 25 | 32 | 12 | 10 |

TB = tensile strain at break in (%);
l = longitudinal;
t = transverse
br.: tensile test specimens fractured during the experiment

We claim:

1. A composite layered sheet or composite layered film comprising a substrate layer and an outer layer, wherein the substrate layer is made from an amorphous styrene polymer and the outer layer is made from a polystyrene molding composition comprising A) from 70 to 95% by weight of a glossy impact-modified polystyrene (HIPS) which has a surface gloss of more than 40%, measured at an angle of 60° according to DIN 67530, or a mixture thereof with standard polystyrene (GPPS), and B) from 5 to 30% by weight of a styrene-based thermoplastic elastomer (STPE).

2. The composite layered sheet or composite layered film of claim 1, wherein the STPE has a tensile strain at break of more than 300%, measured according to ISO 527.

3. The composite layered sheet or composite layered film of claim 1, wherein the STPE is a linear or star-type styrene-butadiene block copolymer with external polyatyrene blocks S and, between these, styrene-butadiene copolymer blocks with a random styrene/butadiene distribution $(S/B)_{random}$ or with a styrene gradient $(S/B)_{taper}$.

4. The composite layered sheet or composite layered film of claim 1, wherein the substrate layer comprises a stress-cracking resistant, impact-modified polystyrene.

5. The composite layered sheet or composite layered film of claim 1, wherein the outer layer has a thickness of from 1 to 10%, based on the total thickness of the composite layered sheet or composite layered film.

6. The composite layered sheet or composite layered film of claim 1, whose total thickness is from 0.1 tO 10 mm.

7. The composite layered sheet or composite layered film of claim 1, wherein the outer layer consists essentially of from 15 to 25% by weight of the styrene-based thermoplastic elastomer (STPE) and from 75 to 85% by weieht of the glossy impact-modified polystyrene (HIPS).

8. The composite layered sheet or composite layered film of claim 1, wherein the impact-modified polystyrene (HIPS) has a surface gloss of more than 70%, measured at an angle of 60° to DIN 67530.

9. The composite layered sheet or composite layered film of claim 1, wherein the impact-modified polystyrene (HIPS) has a surface gloss of more than 80%, measured at an angle of 60° to DIN 67530.

10. A molding which is in form of refrigeration equipment and which comprises the composite layered sheet or composite layered film of claim 1.

11. The composite layered sheet or composite layered film of claim 10, wherein the styrene polymer of the substrate layer comprises an impact-modified polystyrene (HIPS) which has a gel content of at least 30% and comprises a disperse rubber phase having an average particle size of at least 5 μm, determined by light scattering.

12. The composite layered sheet or composite layered film of claim 1, wherein the styrene-based thermoplastic elastomer (STPE) is a styrerie-butadiene block copolymer which comprises from 5 to 40% by weight, based on the weight of the block copolymer, of polystyrene blocks S.

* * * * *

UNITED STATES PATENT AND TRADEMARK OFFICE
CERTIFICATE OF CORRECTION

PATENT NO.         : 7,094,834 B2
APPLICATION NO. : 10/484150
DATED               : August 22, 2006
INVENTOR(S)       : Wagner et al.

It is certified that error appears in the above-identified patent and that said Letters Patent is hereby corrected as shown below:

Column 6, indicated line 26: "0.1 tO 10 mm" should read --0.1 to 10 mm--

Column 6, indicated line 35: "60° to DIN" should read --60° according to DIN--

Column 6, indicated line 41: "60° to DIN" should read --60° according to DIN--

Column 6, indicated line 51: "styrerie-butadiene" should read --styrene-butadiene--

Signed and Sealed this

Seventeenth Day of April, 2007

JON W. DUDAS
*Director of the United States Patent and Trademark Office*